(12) United States Patent
Brust et al.

(10) Patent No.: US 6,650,999 B1
(45) Date of Patent: Nov. 18, 2003

(54) METHOD AND DEVICE FOR FINDING A PARKED VEHICLE

(75) Inventors: Hans-Detlef Brust, Martin-Luther-Str. 2, D-66125 Dudweiler (DE); Mehmet Ali Kilcioglu, Stuttgart (DE)

(73) Assignee: Hans-Detlef Brust, Dudweiler (DE)

( * ) Notice: Subject to any disclaimer, the term of this patent is extended or adjusted under 35 U.S.C. 154(b) by 0 days.

(21) Appl. No.: 09/463,178

(22) PCT Filed: May 25, 1999

(86) PCT No.: PCT/DE99/01538

§ 371 (c)(1),
(2), (4) Date: May 17, 2000

(87) PCT Pub. No.: WO00/34933

PCT Pub. Date: Jun. 15, 2000

(30) Foreign Application Priority Data

May 22, 1998 (DE) .......................................... 198 23 039
Apr. 3, 1999 (DE) .......................................... 199 15 183

(51) Int. Cl.$^7$ .......................... G01C 21/00; B60Q 1/48
(52) U.S. Cl. ........................ 701/213; 701/207; 340/988; 340/932.2
(58) Field of Search ................................ 701/207, 213, 701/214, 216, 300, 1, 24; 340/825.31, 825.34, 825.69, 825.72, 988, 933, 943, 989, 991, 932.2; 235/375

(56) References Cited

U.S. PATENT DOCUMENTS

| | | | |
|---|---|---|---|
| 4,908,629 A | | 3/1990 | Apsell |
| 5,289,369 A | * | 2/1994 | Hirshberg ..................... 705/13 |
| 5,412,379 A | * | 5/1995 | Waraksa et al. ........ 340/825.72 |
| 5,565,874 A | | 10/1996 | Rode |
| 6,529,142 B2 | * | 3/2003 | Yeh et al. ................... 340/988 |

FOREIGN PATENT DOCUMENTS

| | | |
|---|---|---|
| DE | 90 07 501 | 2/1992 |
| DE | 42 24 536 | 1/1994 |
| DE | 44 03 873 | 9/1994 |
| DE | 94 06 605 | 11/1994 |
| DE | 43 40 138 | 6/1995 |
| DE | 195 08 684 | 9/1996 |
| DE | 296 11 708 | 10/1996 |
| DE | 195 44 158 | 5/1997 |
| DE | 196 06 901 | 8/1997 |
| DE | 196 08 777 | 9/1997 |
| DE | 297 13 978 | 12/1997 |
| DE | 297 16 579 | 3/1998 |
| DE | 196 40 735 | 4/1998 |
| EP | 05 66 391 | 10/1993 |
| EP | 0 785 519 | 7/1997 |
| FR | 2 754 093 | 4/1998 |
| GB | 2 317 791 | 4/1998 |
| WO | WO 98 01843 | 1/1998 |

OTHER PUBLICATIONS

Röbke–Doerr, Peter "Die nächste links, bitte! Elektronische Pfadfinder im Auto", c' t–Rom 13/97, pp 1–7. 1990–97.

* cited by examiner

Primary Examiner—Yonel Beaulieu
(74) Attorney, Agent, or Firm—Paul Vincent

(57) ABSTRACT

The invention discloses a device and an apparatus with the assistance of which a driver can locate his parked vehicle of unknown location. The information concerning the instantaneous location of the vehicle gained by a navigation system located in the vehicle is transferred, prior to or at completion of parking, to a mobile terminal which can be carried along by the driver when leaving his vehicle and stored therein. When needed, the driver can recall the information concerning the parked location from the memory of the mobile terminal for display on a monitor in a recognizable manner. Instead of direct storage in the mobile terminal, the information concerning the parked location can also be stored in a remote intermediate memory to which the terminal has access.

28 Claims, 3 Drawing Sheets

METHOD AND DEVICE FOR FINDING A PARKED VEHICLE

BACKGROUND OF THE INVENTION

Many motor-vehicle owners face the problem to find their vehicle some time after having parked the vehicle. Above all, this is a problem when the vehicle has not been parked at its "favorite" parking place—i.e., primarily on the occasion of shopping and leisure rides or when visiting unknown cities.

The most simple solution of this problem—apart from the driver practicing an intensive memorizing training—is that the driver notes the position of his vehicle onto a piece of paper. Just as simple, he could speak the vehicle's position into a voice recorder like a dictating machine. Such systems with a small but for this purpose certainly sufficient memory capacity are meanwhile offered as key-ring tag. Both solutions will usually fail because of the vehicle owner's laziness or his conviction not to need such a help to find his car later on—a conviction that is very often refuted by reality.

Furthermore, there are many methods and devices known that have the purpose to find stolen vehicles or to locate vehicles involved in an accident or to determine the position of a vehicle which is member of a vehicle fleet (e.g., the car fleet of a transport or moving company). Such examples can be found in U.S. Pat. No. 4,908,629, German Patent Application No. DE 196 08 777 A1, German Patent Application No. DE 44 03 873 A1 and German registered utility model No. DE 297 13 978 U1. These methods are mainly based on radio location. Then the vehicle, the position of which is to be determined, has a transmitter aboard, that can be localized with the aid of satellites or mobile or immobile localization receivers. Often, the transmitter is only activated by a radio signal emitted from a control center or by a special event (triggering the air bag at an accident, triggering the alarm signal of a theft protection system, etc.). Theoretically, systems like these could also be employed to find a parked vehicle, but these systems are based on the condition, that the vehicle to be localized can be reached by radio waves. This condition will usually be met by a vehicle moving around in the open country—and if not instantly, the condition will be met a few minutes later. On the other hand, a parked vehicle can be positioned at any location, even at a very unfavorable one, and it will not leave such an unfavorable location. Already at the edge of a narrow street with high sideward buildings, as it is quite common in city centers, the (visual) communication to a satellite will be difficult or even impossible. Especially in town centers and in mountainous regions, there are a lot of radio shadows, where a communication with a vehicle cannot be established. Finally, a vehicle can have been parked in a parking garage. However, reinforced concrete structures act as Faraday cages, so that electromagnetic waves are reliably shielded. This applies even more for underground parking lots.

Apart from these technical differences with respect to searching a stolen vehicle, additionally, there is an important economic difference: a stolen car has a considerable value and a vehicle theft is a relatively seldom event. Thus, the expenditure required to find the car might be quite high. This justifies the high expenditure of mobile radio location groups. Of course, such a high expenditure cannot be accepted for the quite common task of finding a parked vehicle.

It is an object of the present invention to provide a simple and inexpensive tool to tell the driver the position of a vehicle having been parked at any (even at an unfavorable) location at any time, so that the driver can find his vehicle as fast as possible.

SUMMARY OF THE INVENTION

The above object is inventively achieved by a device as claimed.

The fundamental idea of the invention is: at the latest when a parking process occurs the information about the actual position and/or the route that has been traveled is recorded and stored, so that the driver later on can easily retrieve the stored information, when he looks for his vehicle. In this way, a temporal decoupling between the storage of the position information or the route information, respectively, and the later information access by the driver is achieved. Thus, when retrieving the information, it does not matter whether or not radio communication with the vehicle is possible. The information transmission from vehicle to an intermediate storage occurs at any case at a point of time, when the driver is in the direct vicinity of the vehicle, so that an undistorted information transmission is possible.

A further important advantage of the inventive device is that the device automatically (and unperceived by the driver) records the position of the parked vehicle, so that neither the driver's comfort is reduced nor a recording is omitted due to driver overconfidence.

An additional advantage of the inventive device is that it can easily (at least partly) be integrated into electronic devices that the driver carries along with himself anyway, such as mobile phones, paging receivers, electronic organizers or mobile computers.

Further embodiments and modifications of the invention and their advantages are described in the dependent claims and the further description, respectively.

Embodiments of the invention will subsequently be described with the help of the figures;

DESCRIPTION OF THE PREFERRED EMBODIMENT

In the figures the main direction of information flow is depicted by arrows. This does not exclude information, preferably control information, from being transmitted in the opposite direction.

Figure 1:
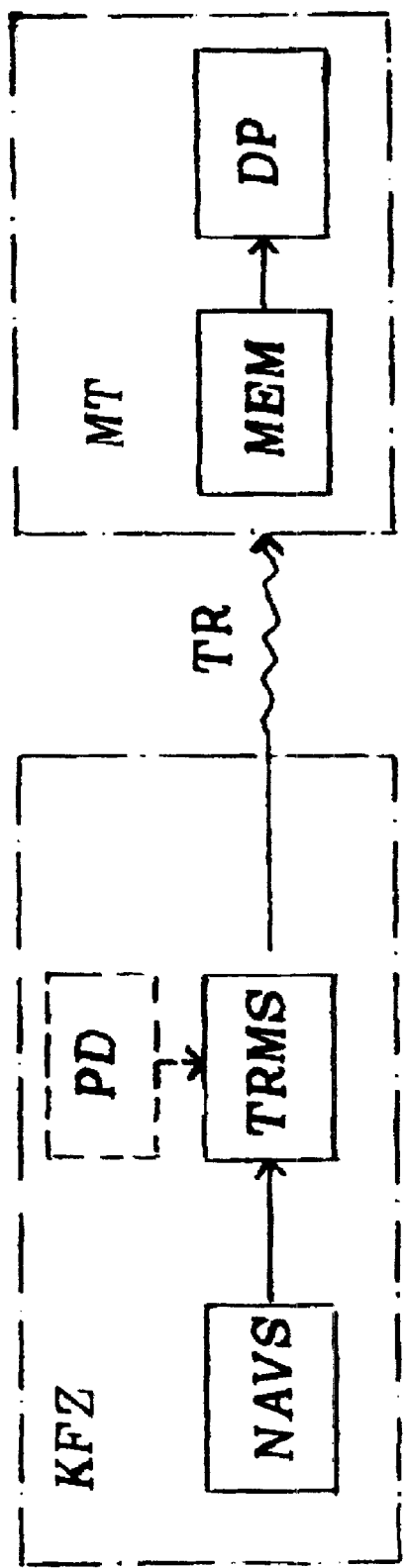
FIG. 1 is a schematic view of the inventive device.

FIG. 1 depicts a schematic view of an embodiment of the inventive device. The vehicle KFZ, which is to be parked and later on found again, contains a navigation system NAVS. Today, a lot of vehicles KFZ (above all upper class vehicles) are already equipped with an electronic navigation system. The more the price of navigation systems is reduced, the more widely are they used. One can already foresee that like today a radio receiver, in a few years, an electronic navigation system NAVS will become a standard equipment of a vehicle KFZ. The systems are usually based on a digitized street map, which is contained in a read-only memory or a CD-ROM. The most simple systems contain only wheel sensors, which measure the rotation of the wheels, (usually, such sensors already exist for anti-skid systems, such as e.g. the so-called ABS-System) and/or an electronic compass (magnetic field sensor, gyro compass or gyroscope). With the assistance of these sensors they can determine direction and traveled distance and then determine the actual position of the vehicle by dead reckoning navigation starting from a known starting point to be entered by the driver. The more the traveled distance increases, the less precise the dead reckoning navigation will be since even small measurement errors will influence the navigation more and more.

Therefore, most modern vehicle navigation systems employ a coarse position determination by means of special satellites which transmit their actual position. Evaluating the propagation delay of the radio signals from the satellite to the vehicle, the position of the receiver can be determined quite accurately by receiving the signals of several satellites. The most commonly known system is the so-called GPS system (GPS=Global Positioning System), the accuracy of which is artificially reduced for military reasons; so, a position determination is only possible with an accuracy of about 30 meters. Therefore, modern vehicle navigation systems additionally employ a dead reckoning navigation based on the information of the electronic street map, by including characteristic route points, e.g. a crossing where a turn occurs, into the evaluation. This procedure helps to cope with temporary radio shadows of one or more satellites by obstacles like buildings. The exact functional principle of such systems is described in the article "Die naechste links, bitte" by Peter Roebke-Doerr, published in the magazine "c't" (issue 13/97, 1997, pages 230 ff.) and in the European Patent No. 566,391, e.g., and is known to those skilled in the art. Such navigation systems can determine the position of a vehicle with an accuracy of a few meters even after a longer traveling distance. In future, satellite-based navigation systems will be able to receive additional and very accurate position information by radio beacons, which are anyhow necessary for modern traffic control systems and which are positioned at the roadside or at bridges, traffic lights, street lamp poles, parking meters, etc.

In future systems, the machine-readable street map must not necessarily be contained in the vehicle KFZ. It is sufficient when the navigation system has access to it, e.g., by means of a radio communication. This is already currently possible by means of an internet access via a mobile phone connected to the navigation system.

With all these systems, the information where a vehicle is parked exists already in the navigation system NAVS in the vehicle KFZ. The fundamental idea of the invention described here is to transmit the information about the position of the parked vehicle KFZ to a mobile terminal unit MT that the driver carries along when leaving his vehicle by means of an device supplementary to the navigation system. This information is stored at the mobile terminal unit MT and can be retrieved by the driver at any time. The transmission of the position information can either occur continuously—at least as long as the vehicle moves—or at least once when the vehicle is parked.

For this purpose, the navigation system NAVS is connected with a data transmission unit TRMS, which can receive the information about the actual position from the navigation system NAVS and then transmits this information via the transmission link TR to the mobile terminal unit MT. The transmission link TR itself is very short and restricted to the car itself and/or its direct vicinity.

The recognition, whether the car is parked, can be performed by a parking detection circuit PD, which is connected with the data transmission unit TRMS and signals to the data transmission unit TRMS via this connection, whether there is an indication for the vehicle being parked or having been parked. In case of a continuous transmission of the position information to the mobile terminal unit MT, the parking detection circuit PD can be omitted.

When continuously transmitting the position information, in principle, it is arbitrary how often the transmission from the navigation system NAVS via the data transmission unit TRMS to the mobile terminal unit MT takes place, but there are several restrictions. The transmission must be done sufficiently often to transmit changes of the vehicle's position to the mobile terminal unit MT. Particularly, when a significant position change of the vehicle takes place, the new position should be transmitted to the mobile terminal unit. This can be achieved by transmitting independently from the movement of the car at predetermined but not necessarily equidistant time intervals (every 10 seconds, e.g.). If the vehicle has not moved during that time, the same position information is again transmitted to the mobile terminal unit MT. The mobile terminal unit thereby contains, in any event, the information about the actual position of the vehicle. On the other hand, the frequency of the transmission can be adapted to the traveling distance (for example, one transmission every 20 m traveled distance).

It is as well arbitrary how long the transmission is effected. It is sufficient to effect a transmission, as long as the vehicle moves. When it is parked and the ignition is turned off, a further transmission is no longer required. Nevertheless, the transmission can continue (in this case, the information that has already be stored will be transmitted again). In this case, the transmission ceases as soon as the driver leaves the vehicle or the direct vicinity of the vehicle and thus leaves the maximum range of the transmission link TR.

With the second possibility described before, the position information of the vehicle KFZ is transmitted at least once only when there is an indication that the vehicle is parked or has been parked. The evaluation and recognition, respectively, that there is an indication of a parking process is performed by the parking detection circuit PD. There are quite a lot of conditions that can or must be valid alone or together and can than be considered as an indication of a parking process. Examples are the vehicle speed dropping below a lower threshold (5 km/h for example), a stop of the vehicle, switching off the ignition, removing the ignition key, a parking position of the automatic gear, actuating the parking brake, opening the driver's door, removing the anti-theft chip card from the car radio or removing the car-radio display as a theft protection measure, locking the steering wheel, actuating the door-lock control, releasing the safety belt, arming the electric intruder-alarm device of the car, the driver leaving the vicinity of the car etc. The parking detection circuit monitors the physical variable that is allocated to the actual condition, as e.g. the vehicle speed, and signals when the chosen condition is met and so delivers an indication for a started, actual or completed parking process.

The indication of a parking process need not be a sufficient condition for parking the car: it is completely adequate if it is a necessary condition. If one chooses as an indication for a parking process a stop of the vehicle with a duration of at least 10 seconds, this condition is a necessary condition without doubt, but in no case is it a sufficient one, since a stop at red traffic lights or at a crossing will meet this condition as well. With the aforementioned condition the parking detection circuit PD monitors the physical variables traveling distance or vehicle speed and time. In this case, the parking detection circuit PD could simply consist of a re-triggerable monoflop with a time constant of about 10 seconds, with each movement (e.g. described by the electrical pulses to the speedometer) triggering the monoflop. Only when the vehicle stops and the speedometer pulses will be absent for at least 10 seconds, the monoflop can return to its stable state, which can than be signaled to the data transmission unit TRMS as indication of a parking process. Other possible embodiments of such parking detection circuits PD are well known to those skilled in the art.

A wrong recognition of a parking process by the parking detection circuit PD—for example, a stop at a traffic light instead of a parking stop—has no severe consequences. Then the position information of the vehicle at the temporary stop is transmitted to the mobile terminal unit MT and stored there. Finally, at the next stop, in particular at the next parking stop, the new position information is transmitted to the mobile terminal unit MT and there overwrites the wrongly stored older information. Indeed, the indication of a parking process must be chosen in a way that the driver and together with him the mobile terminal unit MT are within the range of the transmission link TR when the data transmission unit TRMS transmits the position information. It is therefore not appropriate to choose a stop with a duration of a few minutes as indication of a parking process, although the condition is necessary and with high probability even sufficient for a parking process.

The mobile terminal unit MT must at least temporarily contain a memory unit MEM and a display unit DP. The position information transmitted from the data transmission unit TRMS via the transmission link TR is stored in the memory unit MEM and, whenever required, can be retrieved from the memory and be displayed in a way that can be perceived by the driver.

Figure 2:
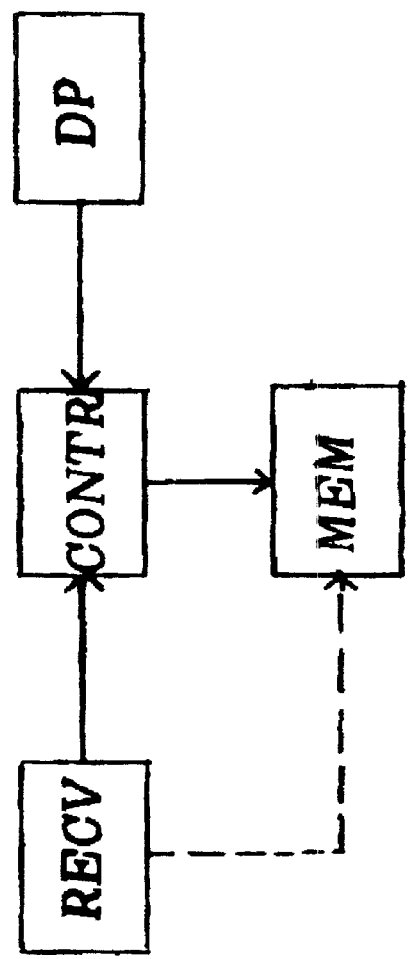
FIG. 2 is a schematic view of a possible embodiment of the mobile terminal unit.

A preferred embodiment of the mobile terminal unit MT is depicted in FIG. 2. The inventive mobile terminal unit MT comprises a data receiving unit RECV that receives and—if necessary—demodulates and decodes the position data sent by the data transmission unit TRSM via the transmission link TR, a control unit CONTR, the memory unit MEM and a display unit DP, which indicates the position of the vehicle to the driver and has the function of a human interface. The power supply which is usually required as well—e.g. in the form of batteries—has been omitted from the figures for clarity reasons. Of course, the power supply must not necessarily be a permanently integral part of the mobile terminal unit. It is certainly possible that the power supply only temporarily has a connection with the mobile terminal unit MT. An output of the data transmission unit TRMS is connected to the input of the control unit CONTR and via this input delivers to the control unit the received and if necessary demodulated signal for further evaluation. The control unit CONTR gains the position information of the vehicle KFZ from the received signal. The control unit CONTR is connected with the memory unit MEM and has read and write access to the memory unit via this connection. Moreover, the control unit CONTR is connected with the display unit DP. Via this connection with the aid of the display unit DP, the control unit CONTR can display the stored information about the last transmitted position of the vehicle and indicate it to the driver. The display unit DP can comprise an input unit, e.g. a keyboard, so that the driver can signal his wish to retrieve the position information and can trigger via the input unit the display of the position information. In this case, the display unit DP signals the corresponding wish of the driver to the control unit CONTR, which then reads the required stored information about the position of the vehicle from the memory unit and transmits it to the display unit DP for displaying it to driver.

What exactly is transmitted as position information depends on the navigation system and especially on the quality and resolution of the electronic street map, which the navigation system is based on. If an electronic street map exists, in any case, the position information should comprise the name of the street, where the vehicle is located, and at least for longer streets the name or the names of the next cross-street or the next cross-streets, respectively. As an alternative to the cross-streets, supplying the approximate house number could be helpful (printed street maps often depict house numbers at crossings; in between an interpolation would be possible). What else is transmitted (e.g. the names and positions of the streets around) depends mainly on the possibilities of the display unit DP.

Alternatively, the position information can comprise only the coordinates of the position. The display of the pure coordinates usually will be of no help for the driver. But if the mobile terminal unit MT itself has access to a digital street map (e.g. because the map is stored in the mobile terminal unit itself), the control unit CONTR can read the coordinates stored in the memory unit MEM as position information, allocate streets to the coordinates by means of the access to the street map and than display these streets as names or graphically at the display unit DP.

Location coordinates as position information are sufficient as well, if the mobile terminal unit MT itself comprises a position determination system, such as e.g. a small GPS receiver. At least outdoors, the mobile terminal unit MT can then compute and display distance and direction from the position of the driver to the parked car and in this way support the driver's search for his car.

The transmission between data transmission unit TRMS and data receiving unit RECV can be effected in any way and can be wireless or wire-bound. For example, a wire-bound transmission is attractive if the mobile terminal unit is realized as a part of the ignition key. In any case, the driver will carry along the ignition key when leaving the car. The transmission can take place by means of electric contacts at the ignition key. These contacts are then part of the data receiving unit RECV.

A wireless transmission can e.g. be effected by means of infrared light, sonic or ultrasonic waves, electric or magnetic or electromagnetic fields or waves. Corresponding transmission systems and the possibilities of modulating and coding the information to be transmitted as well as of demodulating and decoding belong to the prior art already for a long time and are well-known to those skilled in the art.

In Germany the radio transmission at 433 MHz is the first choice. Wireless lock-control systems for vehicles also work at this frequency range. Because of the low permitted radiation power of less than 10 mW, the range of the radio transmission link is limited to the vehicle itself and a range of a few meters around the vehicle.

The control unit CONTR and the memory unit MEM can be realized as a micro-controller. Corresponding realization possibilities are well-known to those skilled in the art. The display unit DP can enable an acoustic or a visual display of the position information.

According to a preferred embodiment of the inventive device, the mobile terminal unit MT is realized as a key-ring tag with the ignition key attached to it. This guarantees that the driver carries along the mobile terminal unit MT when leaving the car. Since several navigation systems work with a speech generation and output devices in order not to distract the driver's attention from driving, these devices could also be used by the inventive device. The position information, e.g. the name of the street where the vehicle is parked and the approximate house number or the name of the next cross-street, can be transmitted in speech form. If the electronic street map does not yet contain the names of the street as speech files, there are meanwhile quite effective algorithms for generating a speech output from a name in text form. For example, such algorithms are employed in the computer program "Via Voice" by the company IBM for reading texts out loud.

The transmission of the position information in speech form to the key-ring tag as mobile terminal unit MT is effected by means of infrared light or radio transmission. The control unit CONTR and the memory unit MEM can then easily be realized as a speech recording system, as it is widely used in telephone answering machines. For this purpose, the speech recording IC ISD1416 produced by the company ISD (ISD=Information Storage Device; retailed with the order number 16 49 84 by the company Conrad electronic, Hirschau, Germany) can be employed. In this case, the display unit simply consists of a loudspeaker and if necessary a preceding low-frequency amplifier and a push-button key; pressing the key the driver can trigger the speech output of the position information.

According to a further embodiment of the inventive device, the mobile terminal is again realized as a key-ring tag. Now, the transmission of the position information is effected in the form of a text. Displaying this information can be achieved by means of a visual display, such as a single-line or multiple-line alphanumeric LCD-Display. The control unit CONTR and the memory unit MEM are realized by a micro-controller. The vehicle position can be displayed continuously. If a graphic display is employed as display unit, the vehicle position can be displayed as a simple street map with the streets around the vehicle position. This information can be transmitted as a bitmap file or correspondingly coded as vector data with the control unit CONTR then generating a bitmap from the vector data.

According to an advantageous modification of the inventive apparatus, the mobile terminal unit MT is not realized as an independent device, rather it will be integrated into an other electronic device, which the driver carries along. For this purpose a lot of electronic devices and more or less useful amusement devices can be taken into consideration. Examples are: mobile phones, pagers (radio-paging devices), electronic wrist-watches, electronic notebooks (so-called organizers) and mobile computers (palmtops, PDAs= personal digital assistants or conventional notebook computers). These devices usually already comprise a microprocessor and a memory unit and moreover quite often even a graphic display, elements that can be used as control unit CONTR, as memory unit MEM and as display unit DP of the mobile terminal unit as well. A mobile phone additionally offers an acoustic output. Thus, those devices would mainly have to be completed by a simple data receiving unit RECV an the required software.

For a radio-paging receiver even the data receiving unit RECV could be omitted, if the data transmission unit TRMS could transmit in the frequency range and using the protocol of the radio-paging receiver. From a technical point of view this is no problem but there are a lot of legal obstacles (inadmissable frequency range). Employing a pager, it would be sufficient to modify the software of the internal processor.

A car radio receiver is a further electronic device in which the parts of a mobile terminal unit MT can be advantageously implemented. As a protection against thefts, many car-radio receivers have a detachable display panel, which the driver must remove and carry along when leaving the car—which is a prerequisite for integration of the mobile terminal unit. Usually, the front panel already comprises a LCD display for displaying radio data, a display that is as well suited as display unit DP of the mobile terminal unit MT.

In a further embodiment of the inventive apparatus, the data receiving unit RECV has a direct connection to the memory unit MEM (depicted as dotted line in the figure); via this connection the data receiving unit RECV can transmit the position information directly to the memory unit MEM for storage while avoiding the control unit CONTR. Possibly required control information could be generated by the data transmission unit TRMS.

According to a further preferred embodiment of the inventive apparatus, the mobile terminal unit MT does not consist of a single device, rather it is made up from several independent parts, wherein there is at least temporary wireless and/or wire-bound connection between the parts of the mobile terminal unit. Such a separation is favorable for navigation systems that use a chip card as theft protection for the navigation or radio receiver (as e.g. the navigation system "Travel-Pilot" produced by the company Blaupunkt, Hildesheim, Germany). In such a case, the mobile terminal unit MT can consist of the chip card and a card reader unit preferably realized as key-ring tag. This solution guarantees as well that the driver carries along both parts of the mobile terminal unit when leaving the car, since he must take and carry along the chip card as theft protection and in any case needs the key-ring tag with the ignition key attached to it.

In this special embodiment of the inventive apparatus the memory unit MEM is part of the chip at the chip card, e.g. realized as EEPROM or flash memory. Possibly, this is the case as well for the entire control unit CONTR or parts of it, but the control unit CONTR can also be part of the card reader unit. The aforementioned direct connection between the data receiving unit RECV and the memory unit MEM can advantageously be applied in this modification. The card reader unit particularly comprises the display unit DP, preferably an optical display, and furthermore if necessary parts of the control unit CONTR or even the entire control unit CONTR. The contacts at the chip card and, if necessary, level converters and decoding circuits function as the data receiving unit RECV. If the chip card is a contactless chip card with magnetic field data transmission, the receiving coil and the attached receiver are parts of the data receiving unit RECV as well. During the vehicle ride the chip card is positioned in a slot of the car radio receiver or the navigation system, respectively. Preferably via the contacts of the chip card, the data transmission unit TRMS transmits the position information to the chip card, where it is stored in the memory unit MEM. When parking and leaving the vehicle, the driver removes the chip card from the slot. The memory unit MEM of the chip card then contains the position data of the location of the parked car. When the driver later on wants to know the location of the parked car, he simply can insert the chip card into the card reader unit. There again preferably via the contacts of the chip card, the position information is transferred to the display unit DP in the card reader, i.e., for example the LCD display in the card reader, and displayed thereon. Reading and transferring the position information is again done by the control unit CONTR, which is either located at the chip card or at the card reader or partly at the chip card and partly at the card reader.

The inventive apparatus and particularly the mobile terminal unit MT with the memory unit MEM have been described above as an electronic system. Nevertheless, it is within the scope of the invention, to realize the apparatus or parts of it not as an electronic system but rather e.g. as an optical system. Such an embodiment of the invention could employ a printable chip card, which can moreover be used as theft protection for the car radio receiver, as a mobile terminal unit. The printable surface of the chip card is the memory unit MEM. The data transmission unit TRSM for this embodiment is a printing and erasing unit in the car radio receiver attached above or below the chip card carrier. As erasing unit, a magnetic erasing head or a sponge roll saturated by a solvent agent that cleans the surface of the chip card when it is inserted—in other words, erases the memory—can e.g. be employed. When the vehicle is parked and the chip card is to be removed, during the removing process (removing the chip card is also the indication of a parking process) the printing unit (a small ink jet or thermotransfer printing head, e.g.) prints the name of the street or small map of the surroundings onto the surface of the chip card. Display unit DP and memory unit MEM are here identical; they are realized by the surface of the chip card, since the position information is directly stored in a manner that is perceptible and readable by the driver. The transmission link TR corresponds to the flight route of the ink drops of an ink jet printer, the generated magnetic field of a magnetic print head, or the generated thermal field at the surface of the chip card in a thermal print head.

Figure 3:
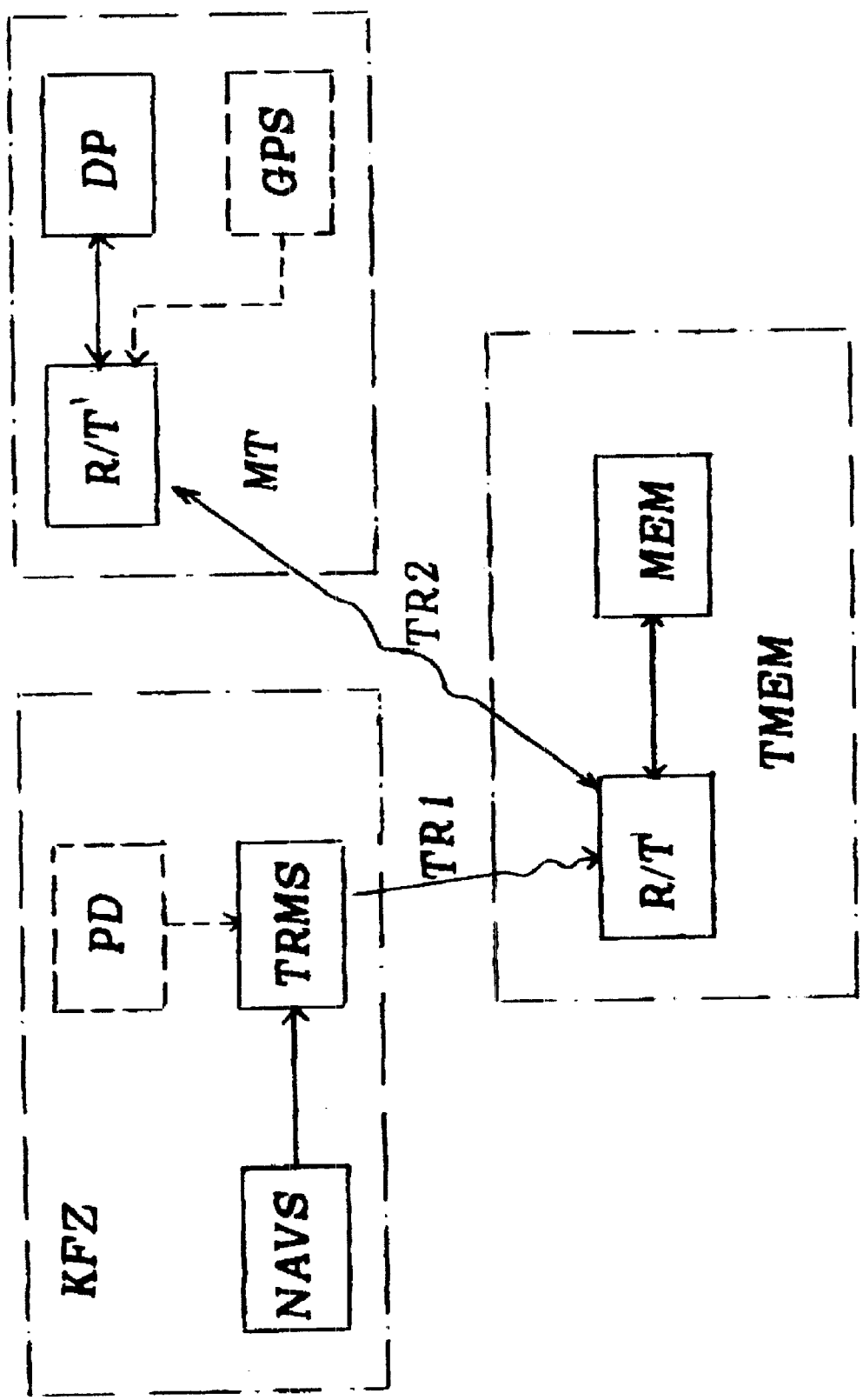
FIG. 3 is a schematic view of a further embodiment of the inventive device.

According to another embodiment of the invention depicted in FIG. 3 the part of the apparatus located in the vehicles remains unchanged in principle, but the memory unit MEM, where the position information of the vehicle KFZ is stored, is no longer located in the mobile terminal unit MT but is part of an intermediate memory TMEM that is located outside of the car. When required, the driver can retrieve the position information from there via his mobile terminal unit MT and display it at its display unit DP. The intermediate memory TMEM additionally contains a transmitting/receiving unit R/T that can receive and, if necessary, demodulate and decode the position information of the vehicle KFZ transmitted by the data transmitting unit TRSM via a first transmission link TR1 and is connected with the memory unit MEM. The transmitting/receiving unit R/T receives the position information via the first transmission link TR1, and the position information is transferred to the memory unit MEM via the connection between the transmitting/receiving unit R/T and the memory unit MEM and then stored in the memory unit MEM. A possible intermediate memory TMEM could be a computer equipped with a modem and a network connection (preferably an internet connection) and/or a connection to a radio or telephone network or an telephone answering machine with connection to a telephone network.

Finally, this embodiment of the invention also comprises a mobile terminal unit MT that the driver can easily carry along when leaving the car. Preferably, the mobile terminal unit is an integral part of another device that the driver usually carries. First of all, a mobile phone or an electronic notebook (palmtop) are such devices. Preferably in a wireless manner by means of radio transmission, the mobile terminal unit MT can establish a communication with the intermediate memory TMEM or its transmitting/receiving unit R/T, respectively, via a second transmission link TR2. For this purpose, the mobile terminal unit MT is equipped with a further transmitting/receiving unit R/T'. The intermediate memory TMEM then transmits the position information stored in the memory unit MEM to the further transmitting/receiving unit R/T' of the mobile terminal unit MT via the second transmission link TR2; the mobile terminal unit MT can then display this information at the display unit DP (e.g. a visual display) in a manner perceptible by the driver. In contrast to the embodiments of the invention described before, with this embodiment, and in contrast to the transmission link TR, the first and the second transmission links TR1 and TR2 are no longer limited to the interior space or the direct vicinity of the vehicle, rather they can bridge wide distances.

When the driver cannot remember where he has parked has car, he simply contacts the intermediate memory TMEM by means of his mobile terminal unit MT carried along, he lets transmit the information about the location of his parked vehicle via the second transmission link TR2 and then he lets display that information at the display unit DP.

According to a preferred embodiment of the inventive device, the mobile terminal unit MT is a mobile phone with internet access and with graphic display as display unit DP. Also, the data transmission unit TRMS located in the vehicle is a mobile phone with internet access. The intermediate memory TMEM is realized by an internet computer, which can act as a web server. The transmission links TR1 and TR2 then are radio communication links in the corresponding mobile phone network, preferably in a GSM cellular phone network. Because of the relatively small amount of data (this particularly applies to the position data), the basic transmission can occur as a short message via SMS (=short message service) or as inexpensive data transmission. The web server, which acts as intermediate memory TMEM, should itself have a digitized street map, so that, by evaluating the transmitted and stored position information, it can determine the name of the street and a small map of the surroundings of the vehicle location and transmit these data to the mobile terminal unit MT, which then can display these data at its graphic display as display unit DP in a manner comprehensible for the driver.

According to a favorable modification of this device the mobile terminal unit MT itself comprises a position determination system GPS, e.g. a small GPS receiver, and apart from the information request about the location of the parked vehicle transmits along with the request the position information of the driver. With the aid of the stored position information of the vehicle KFZ and the transmitted position information of the driver and by accessing the electronic street map, the web server then determines the route required for the driver to get to his vehicle. This route as map, as route description or just as direction information is then transmitted to the mobile terminal unit and there displayed to the driver. If the driver manually enters his position (e.g. as street name and house number) at the mobile phone, an additional GPS receiver is no longer required and the route from the position of the driver to the location of the vehicle KFZ can nevertheless be determined, transmitted and displayed.

The units depicted in the figure must not necessarily be completely separated; at least temporarily they can be connected. So, according to another modification of the inventive device, the mobile terminal unit MT is again realized as a mobile phone with internet access. During the ride and during the parking process the mobile phone is attached to the carrier of a hands-free telephone arrangement aboard the vehicle KFZ and is connected with the navigation system NAVS. Such a connection between navigation system and mobile phone is known from the German registered utility model DE 90 07 501 U1, for example. During this time the mobile phone can thus act as a part of the data transmission unit TRMS. When leaving the vehicle KFZ the driver removes the mobile phone from its carrier and carries it along. At this moment, the mobile phone becomes the mobile terminal unit MT.

According to a favorable modification of the inventive device, the mobile phone can even play a more prolonged double role. So, it is possible that during the parking process there is no connection to a mobile phone net, since the vehicle is located in a radio shadow or since a parking garage built from reinforced concrete acts like a Faraday cage thus obstructing the propagation of electromagnetic waves. In this case, the mobile phone can temporarily store the position information of the vehicle and then at next opportunity, i.e. when the radio communication to the cellular network is reestablished, transmit the information to the intermediate memory TMEM. Here, even the data transmission unit TRMS is temporarily separated from the vehicle KFZ.

According to a modification of the invention, the position information of the vehicle is not or not only transmitted to the mobile terminal unit MT or the intermediate memory TMEM, respectively; rather information about the traveled route are transmitted also. This procedure is favorable, when the street map which the navigation system is based on does not "know" some positions. This can apply to a big parking lot. At the street map then the entrance of the parking lot is mostly registered but not the positions within the parking lot. When dealing with a parking lot it is not sufficient for the driver to find the parking lot, rather he wants to know exactly where his vehicle is parked. If the route has been registered and stored from the last known position at the entrance of the parking lot to the location where the parking process occurred, the driver can follow the registered route. Based upon the stored information about the route traveled by the vehicle, the bearing and the distance of the vehicle relative to the last known position—in the described example relative to the entrance of the parking lot—can easily be computed and displayed. This procedure should be sufficient to find the vehicle again. When using this modification of the invention the route traveled by the vehicle should not only be registered two-dimensionally but rather three-dimensionally. Particularly, in multi-story parking garages the third dimension, i.e. the story where the vehicle has been parked is quite important.

Figure 4:
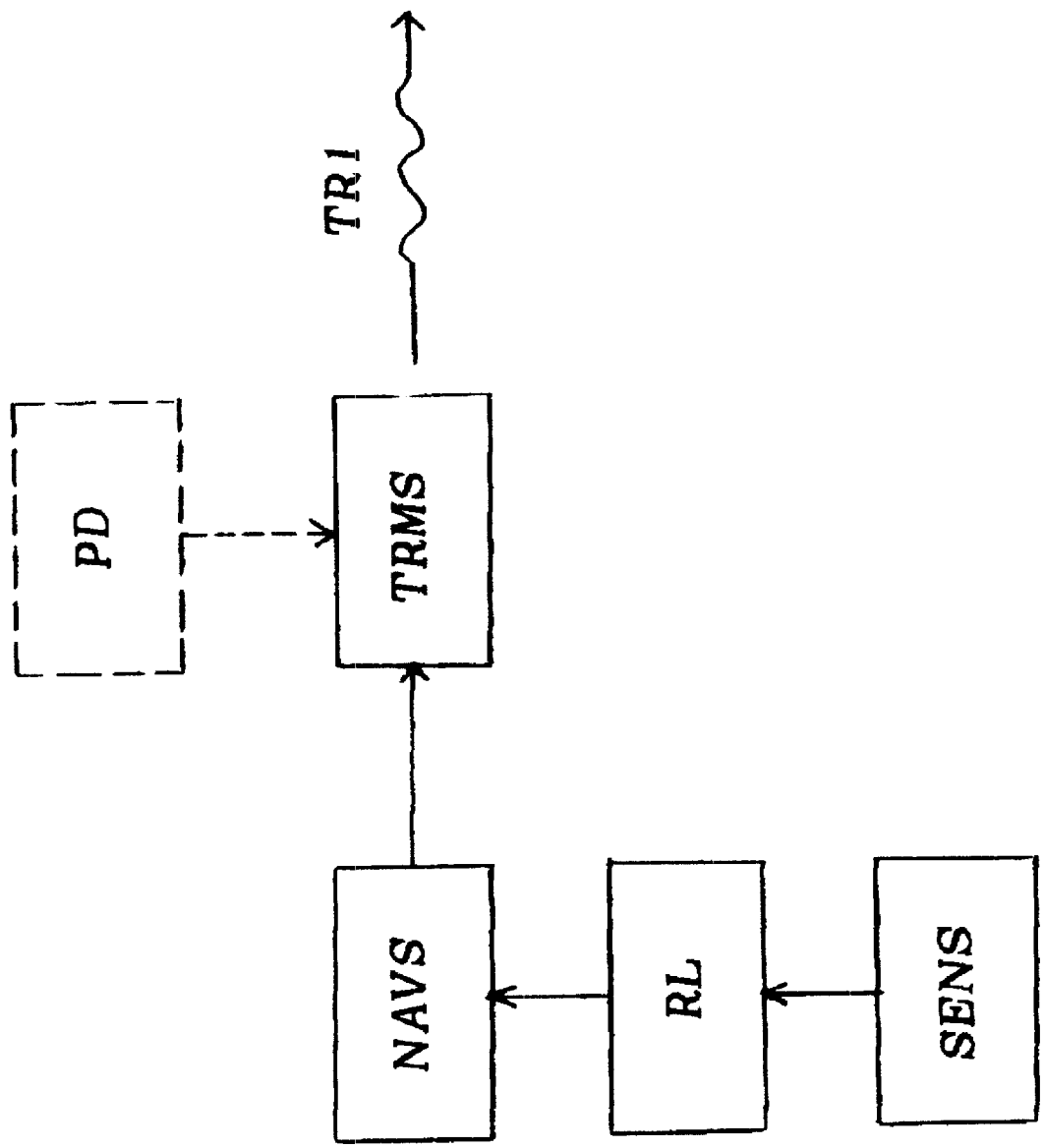
FIG. 4 is a schematic view of an extension of that part of the inventive device which is located aboard the vehicle.

For this modification of the invention, the navigation system NAVS located inside the vehicle must be extended. The required setup is depicted in FIG. 4. Compared with the device depicted in FIGS. 1 and 3, a route registering unit RL that gathers and registers the information about the route traveled by the vehicle and the sensors SENS necessary for acquiring route data (to keep the figure simple and clear only one sensor is depicted) have been added. As a matter of fact, sensors that are already in the car for other purposes can be employed as well. This applies e.g. to the aforementioned ABS wheel sensors or for tilt sensors, which are part of an anti-theft system, or to radio-beacon receivers. These sensors are connected to the route registering unit RL and deliver their data about the route traveled by the vehicle to the registering unit RL via this connection. The route registering unit RL continuously registers this information and, if required, transfers it to the navigation system NAVS or the data transmission unit TRMS. The route registering unit RL itself can be a part of the navigation system NAVS or can as well make use of parts of the navigation system since the procedure of dead reckoning navigation carried out by many navigation systems widely corresponds to the task of the route registering unit RL. Since a considerable amount of route data is acquired when travelling, these data can been compressed or reduced to a few relevant data already at recording or when entering or when storing the data. As already explained, it might be sufficient to know the bearing and distance of a few route points referred to the starting point.

Although so far the subject of the discussion was how the driver could find his vehicle, of course, any other person, e.g. a member of the driver's family, could employ the inventive apparatus to find a parked vehicle as well. This is a very easy task, when this other person has a second mobile terminal unit MT which can also contact the intermediate memory. Alternatively, the second mobile terminal unit could establish a wireless data communication with the mobile terminal unit of the driver and read the data stored there in the memory unit. This is especially easy when the mobile terminal units are mobile phones.

Apart from finding a parked car, there is a further advantageous application of the inventive apparatus: the documentation of the location of the parking place in case of a theft of the vehicle. Many car insurance contracts contain clauses, that at night the car must be parked in a garage or at an attended parking lot, in order to get a reduction of the insurance fees or to get the insurance protection at all. When registering the location of the parking place in the mobile terminal unit MT or the intermediate memory TMEM, an evidence can be given where the car has been parked and, thus, whether it has been parked according to the insurance conditions. For this purpose, additionally to the pure position information other data like date and time and if necessary status data of the vehicle (closing state of the windows, status of the intruder alarm system, etc.) must be stored. Moreover, these data should be stored in an encrypted form in order to prevent later manipulation by the driver.

If not only the data of the last parking process but rather the data of former parking processes are stored in the mobile terminal unit MT or in the intermediate memory TMEM, a documentation of the rides in a log-book can easily be performed. For this purpose, the time and the distance traveled should be stored together with each parking process. This application is especially favorable, when the mobile terminal is (at least partly) a chip card, for which then card readers attachable to a computer exist.

Of course, not only the described examples of embodiments and modifications are within the scope of the invention but also their combinations. Although the inventive apparatus has been described for the example of an automobile, it is within the scope of the invention to apply the inventive apparatus to any kind of watercraft, aircraft or land craft, which has been equipped with an electronic navigation system. When the expression navigation system has been used so far, this should be understood in the way that even a simple position determination system, such as a simple GPS receiver without access to an electronic street map, should be considered to be a navigation system. Within the context of this patent application the expressions position information and position data are used synonymously.

We claim:

1. A device for assisting a driver in finding his parked vehicle, the device comprising:
   a navigation system disposed on the vehicle for determining at least one of position data of the vehicle and data about a traveled route;
   a data transmission unit for connection to said navigation system to receive at least one of said position data of the vehicle and said data about the traveled route, said data transmission unit transmitting at least one of said position data of the vehicle and said data about the traveled route in one of a wireless and a wire-bound manner;

a mobile terminal unit to be carried by the driver when leaving the vehicle, said mobile terminal unit comprising means for at least temporary accommodation of a memory unit;

said mobile terminal unit receiving said data transmitted by said data transmission unit via a data transmission link and storing said data in said memory unit, wherein said data transmission link has a transmission range which is restricted to one of an interior and a direct vicinity of the vehicle; and a display unit for connection to said mobile terminal unit to display at least one of said position data of the vehicle and said data about the traveled route, as stored in said memory unit, for observation by the driver.

2. The device of claim 1, wherein said data transmission unit transmits said data to said mobile terminal unit as long as the vehicle is moving.

3. The device of claim 1, wherein said data transmission unit transmits said data of to said mobile terminal unit in response to an indication of a parking process.

4. The device of claim 3, further comprising a parking detection circuit connected to said data transmission unit to continuously monitor an indication of a parking process and for signaling such an indication to said data transmission unit to trigger transmission of said data by said data transmission unit to said mobile terminal unit.

5. The device of claim 1, wherein said mobile terminal unit further comprises:

a data receiving unit to at least one of receive, demodulate and decode said data transmitted by said data transmission unit via said data transmission link;

a control unit connected to an output of said data receiving unit and to said memory unit, said control unit receiving said data transmitted by said data transmission unit to said data receiving unit, said control unit having read and write access to said memory unit for storing and subsequent reading of said data to and from said memory unit, wherein said display unit is connected to said control unit to receive said data from said control unit for display thereof after said control unit has previously read said data from said memory unit.

6. The device of claim 5, wherein said data receiving unit, said control unit, said memory unit and said display unit are resident within independently transferable parts from which said mobile terminal unit is constructed.

7. The device of claim 1, wherein said mobile terminal unit comprises a chip card.

8. The device of claim 1, further comprising an additional electronic device carried by the driver when leaving the vehicle, wherein said mobile terminal unit is an integral part of said additional device.

9. The device of claim 1, wherein said position data of the vehicle comprise at least one of coordinates of a vehicle location, a name of a street where the vehicle is positioned, an approximate house number of a vehicle position in a street, and a name of a next cross-road.

10. The device of claim 1, wherein said memory unit comprises an optical memory that stores said data and information associated with said data in a manner directly perceptible by the driver.

11. The device of claim 1, wherein said mobile terminal unit comprises one of a position determination system and an input device for manual input of a driver position.

12. The device of claim 1, further comprising a route registering unit connected to several sensors and disposed in the vehicle.

13. A device for assisting a driver in finding his parked vehicle, the device comprising:

a navigation system disposed on the vehicle for determining at least one of position data of the vehicle and data about a traveled route;

a data transmission unit for connection to said navigation system to receive at least one of said position data of the vehicle and said data about the traveled route and to transmit at least one of said position data of the vehicle and said data about the traveled route;

an intermediate memory disposed outside of the vehicle and having a memory unit and a transmitting/receiving unit connected to said memory unit, said transmitting/receiving unit receiving said data transmitted by said data transmission unit via a first transmission link said intermediate memory storing at least one of said position data and said data about the traveled route in said memory unit; and a mobile terminal unit to be carried by the driver when leaving the vehicle, said mobile terminal unit for one of accommodating and connecting a display unit, said mobile terminal unit communicating, via a second transmission link, with said intermediate memory to receive at least one of said position data and said data about the traveled route as stored in said memory unit and to facilitate display thereof for observation by the driver.

14. The device of claim 13, wherein said data transmission unit transmits said data to said intermediate memory as long as the vehicle is moving.

15. The device of claim 13, wherein said data transmission unit transmits said data to said intermediate memory in response to an indication of a parking process.

16. The device of claims 15, further comprising a parking detection circuit connected to said data transmission unit to continuously monitor an indication of a parking process and for signaling such an indication to said data transmission unit to trigger transmission of said data by said data transmission unit to said intermediate memory.

17. The device of claim 13, wherein functional circuits of said mobile terminal unit are resident within independently transferable parts from which said mobile terminal unit is constructed.

18. The device of claim 13, wherein said mobile terminal unit comprises a chip card.

19. The device of claim 13, further comprising an additional electronic device carried by the driver when leaving the vehicle, wherein said mobile terminal unit is an integral part of said additional device.

20. The device of claim 13, wherein said position data of the vehicle comprise at least one of coordinates of a vehicle location, a name of a street where the vehicle is positioned, an approximate house number of a vehicle position in a street, and a name of a next cross-road.

21. The device of claim 13, wherein said mobile terminal unit is one of a mobile phone and a mobile computer with internet access and wherein said intermediate memory is an internet computer.

22. The device of claim 13, wherein said mobile terminal unit comprises one of a position determination system and an input device for manual input of a driver position.

23. The device of claim 13, wherein transmission of at least one of said position data of the vehicle and said data about the traveled route to said intermediate memory is effected with a time offset.

24. The device of claim 13, wherein said mobile terminal unit for integration into said data transmission unit.

25. The device of claim 13, further comprising a route registering unit connected to several sensors and disposed in the vehicle.

26. A method for assisting a driver in finding his parked vehicle, the method comprising the steps of:
- a) determining, using a navigation system disposed aboard the vehicle, at least one of position data of the vehicle and data about a traveled route;
- b) receiving, using a data transmission unit connected to said navigation system, at least one of said position data of the vehicle and said data about the traveled route from said navigation system;
- c) transmitting, using said transmission unit and via transmission link, said data to one of a mobile terminal unit which the driver can carry along when leaving the car and an intermediate memory;
- d) storing said data in a memory unit; and
- e) reading, using said mobile terminal unit, at least one of said position data of the vehicle, said traveled route, and information associated therewith from said memory unit; and
- f) displaying said data on a display unlit for observation by the driver.

27. The method of claim 26, wherein step e) comprises the step of transmitting said data from said intermediate memory to said mobile terminal via a second transmission link.

28. The method of claim 26, further comprising:
- g) recording said data for one of documentation and logging thereof.

* * * * *